United States Patent
Lo et al.

(10) Patent No.: US 11,222,117 B2
(45) Date of Patent: Jan. 11, 2022

(54) HSM SELF-DESTRUCTION IN A HYBRID CLOUD KMS SOLUTION

(71) Applicant: INTERNATIONAL BUSINESS MACHINES CORPORATION, Armonk, NY (US)

(72) Inventors: Erlander Lo, Leander, TX (US); Karunakar Bojjireddy, Apex, NC (US); Angel Nunez Mencias, Stuttgart (DE); Marco Pavone, Ehningen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 209 days.

(21) Appl. No.: 16/144,251

(22) Filed: Sep. 27, 2018

(65) Prior Publication Data
US 2020/0106607 A1   Apr. 2, 2020

(51) Int. Cl.
*G06F 21/57*   (2013.01)
*H04L 29/06*   (2006.01)

(52) U.S. Cl.
CPC .......... *G06F 21/57* (2013.01); *H04L 63/062* (2013.01); *H04L 63/0853* (2013.01); *H04L 63/0876* (2013.01); *H04L 63/10* (2013.01)

(58) Field of Classification Search
CPC ....................................................... G06F 21/57
See application file for complete search history.

(56) References Cited

U.S. PATENT DOCUMENTS

| | | | |
|---|---|---|---|
| 8,370,312 B1 | 2/2013 | Sawhney et al. | |
| 9,009,475 B2* | 4/2015 | Hauck | H04L 63/06 713/168 |
| 9,973,496 B2* | 5/2018 | Boenisch | H04L 63/0853 |
| 9,985,975 B2 | 5/2018 | Roth et al. | |
| 10,095,549 B1* | 10/2018 | Needham | G06F 9/468 |
| 10,305,906 B1* | 5/2019 | Norum | H04L 9/0897 |
| 2002/0002683 A1* | 1/2002 | Benson | G06F 21/87 713/194 |

(Continued)

FOREIGN PATENT DOCUMENTS

WO   2010057312 A1   5/2010

OTHER PUBLICATIONS

List of IBM Patents or Patent Applications Treated as Related, dated Jul. 18, 2019, 1 page.
Sayler, "Securing Secrets and Managing Trust in Modern Computing Applications", https://scholar.colorado.edu/csci_gradetds/112, Computer Science Graduate Theses & Dissertations, 112, Jan. 1, 2016, 213 pages.

(Continued)

*Primary Examiner* — Bradley W Holder
(74) *Attorney, Agent, or Firm* — Scott Dobson; Andrew D. Wright; Roberts Calderon Safran & Cole, P.C.

(57) ABSTRACT

A computer program product, the computer program product including a computer readable storage medium having program instructions embodied therewith, the program instructions executable by a computer device to cause the computer device to: federate a proxy hardware security module from a physical hardware security module; store the proxy hardware security module; receive a first one of a plurality of periodic identifying communications from the physical hardware security module; and erase the proxy hardware security module as a result of the computer device not receiving a second one of the plurality of periodic identifying communications.

25 Claims, 6 Drawing Sheets

(56) References Cited

U.S. PATENT DOCUMENTS

| | | | |
|---|---|---|---|
| 2005/0156026 A1* | 7/2005 | Ghosh | G07F 7/1008 235/380 |
| 2007/0289006 A1* | 12/2007 | Ramachandran | H04L 9/3263 726/10 |
| 2010/0235630 A1 | 9/2010 | Carter et al. | |
| 2013/0179676 A1* | 7/2013 | Hamid | H04L 63/0823 713/150 |
| 2013/0219164 A1* | 8/2013 | Hamid | H04L 9/08 713/150 |
| 2013/0226812 A1 | 8/2013 | Landrok et al. | |
| 2014/0122866 A1 | 5/2014 | Haeger et al. | |
| 2014/0282936 A1* | 9/2014 | Fitzgerald | H04L 63/0272 726/6 |
| 2015/0358161 A1* | 12/2015 | Kancharla | G06F 21/602 713/164 |
| 2016/0028693 A1* | 1/2016 | Crawford | G05B 19/058 726/12 |
| 2016/0105429 A1* | 4/2016 | Boenisch | H04L 63/062 713/171 |
| 2017/0012967 A1 | 1/2017 | Holloway et al. | |
| 2017/0083716 A1* | 3/2017 | Sun | H04L 9/14 |
| 2017/0286697 A1* | 10/2017 | Shetty | H04L 63/0471 |
| 2017/0286698 A1* | 10/2017 | Shetty | H04L 63/0471 |
| 2017/0374048 A1 | 12/2017 | Fleischman et al. | |
| 2018/0248911 A1 | 8/2018 | Hocker et al. | |

OTHER PUBLICATIONS

Yue et al., "A secure self-destructing scheme for electronic data." Embedded and Ubiquitous Computing (EUC), 2010 IEEE/IFIP 8th International Conference, IEEE, 2010, 8 pages.

Mell et al., "The NIST Definition of Cloud Computing", NIST, Special Publication 800-145, Sep. 2011, 7 pages.

Weissman et al., "Using Proxies to Accelerate Cloud Applications", https://www.usenix.org/legacy/event/hotcloud09/tech/full_papers/weissman.pdf, HotCloud'09 Proceedings of the 2009 conference on Hot topics in cloud computing Article No. 20, San Diego, California, 2009, 5 pages.

Kamplee et al., "Data Sharing and Self-Destruction Scheme in Cloud", https://www.ijcaonline.org/archives/volume178/number4/kamplee-2017-ijca-915817.pdf, International Journal of Computer Applications (0975-8887) vol. 178—No. 4, Nov. 2017, 5 pages.

International Search Report and Written Opinion of the International Searching Authority dated Jan. 8, 2020 in PCT Application No. PCT/IB2019/057926, 10 pages.

Hearn, "Inventor develops self-destructing memory stick", https://www.oxfordmail.co.uk/news/5019061.inventor-develops-self-destructing-memory-stick/, Feb. 21, 2010, 2 pages.

Notice of Allowance dated Aug. 18, 2021 for related U.S. Appl. No. 16/509,965, 12 pages.

Office Action dated May 13, 2021 in related U.S. Appl. No. 16/509,965, 13 pages.

* cited by examiner

HSM SELF-DESTRUCTION IN A HYBRID CLOUD KMS SOLUTION

BACKGROUND

The present invention relates generally to the security of encrypted data and, more particularly, to the security of an encrypted key management service in the cloud.

Some companies and other users desiring a high level of security require their keys and secrets to be stored inside of a physical hardware security module (HSM). The physical HSM can be stored on the premises of the user and be under the user's control. Some of these users are now using the cloud for various functions and, as a result, require a key management service (KMS) for activities on the cloud.

In one conventional system, a secure payment system provisions a payment transaction proxy with virtual EMV-type chipcards on secure backend servers. Users authorize the proxy in each transaction to make payments in the Cloud for them. The proxy carries out the job without exposing the cryptographic keys to risk. Some users, while satisfied with the level of security provided by a physical HSM stored on their premises, are not as satisfied by the idea of a proxy existing in the cloud and being under the control of cloud service providers. Accordingly, there is a need for a system that provides the accessibility required for some cloud-based transactions, but also provides the user with the desired level of security.

SUMMARY

In a first aspect of the invention, there is a computer program product including a computer readable storage medium having program instructions embodied therewith. The program instructions are executable by a computer device to cause the computer device to: federate a proxy hardware security module from a physical hardware security module; store the proxy hardware security module; receive a first one of a plurality of periodic identifying communications from the physical hardware security module; and erase the proxy hardware security module as a result of the computer device not receiving a second one of the plurality of periodic identifying communications. The prior art has a disadvantage in that a conventional proxy HSM on the cloud may be disconnected from the physical HSM with the proxy HSM still existing. This aspect of the invention provides added security in that the proxy HSM is erased by the computer device as a result of the computer device not receiving the expected periodic identifying communications.

In an advantageous aspect of the invention, the program instructions executable by the computer device cause the computer device to erase the proxy hardware security module as a result of the computer device not receiving a predetermined number of successive ones of the plurality of periodic identifying communications. This aspect of the invention provides the added advantage of the proxy HSM still existing if less than a predetermined number of successive ones of the plurality of periodic identifying communications are not received.

In another aspect of the invention, there is a system including a processor, a computer readable memory, and a computer readable storage medium. The system includes: program instructions to federate a proxy hardware security module from a physical hardware security module; program instructions to store the proxy hardware security module; program instructions to receive a first one of a plurality of periodic identifying communications from the physical hardware security module; and program instructions to erase the proxy hardware security module as a result of the computer device not receiving a second one of the periodic identifying communications. The program instructions are stored on the computer readable storage medium for execution by the processor via the computer readable memory. The prior art has a disadvantage in that a conventional proxy HSM on the cloud may be disconnected from the physical HSM with the proxy HSM still existing. This aspect of the invention provides added security in that the proxy HSM is erased by the system as a result of the system not receiving the expected periodic identifying communications.

An advantageous aspect of the invention includes program instructions to erase the proxy hardware security module as a result of the computer device not receiving a predetermined number of successive ones of the plurality of periodic identifying communications. This aspect of the invention provides the added advantage of the proxy HSM still existing if less than a predetermined number of successive ones of the plurality of periodic identifying communications are not received.

In another aspect of the invention, there is a system including: a physical hardware security module storing an encryption key; a federated proxy hardware security module that is federated from the physical hardware security module, the federated proxy hardware security module storing a federated copy of the encryption key; program instructions on the physical hardware security module to send a plurality of periodic identifying communications; program instructions on the federated proxy hardware security module to receive the plurality of periodic identifying communication from the physical hardware security module; and program instructions on the federated proxy hardware security module to erase the federated proxy hardware security module and the federated copy of the encryption key as a result of the federated proxy hardware security module not receiving a first predetermined number of the plurality of periodic identifying communications. The prior art has a disadvantage in that a conventional proxy HSM on the cloud may be disconnected from the physical HSM with the proxy HSM still existing. This aspect of the invention provides added security in that program instructions on the proxy HSM erase the proxy HSM and the copy of the encryption key as a result of the proxy HSM not receiving the expected periodic identifying communications.

An advantageous aspect of the invention includes program instructions on the federated proxy hardware security module to erase the federated proxy hardware security module and the federated copy of the encryption key as a result of the federated proxy hardware security module not receiving a second predetermined number of successive ones of the plurality of periodic identifying communications. This aspect of the invention provides the added advantage of the proxy HSM and the copy of the encryption key still existing if less than a predetermined number of successive ones of the plurality of periodic identifying communications are not received.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
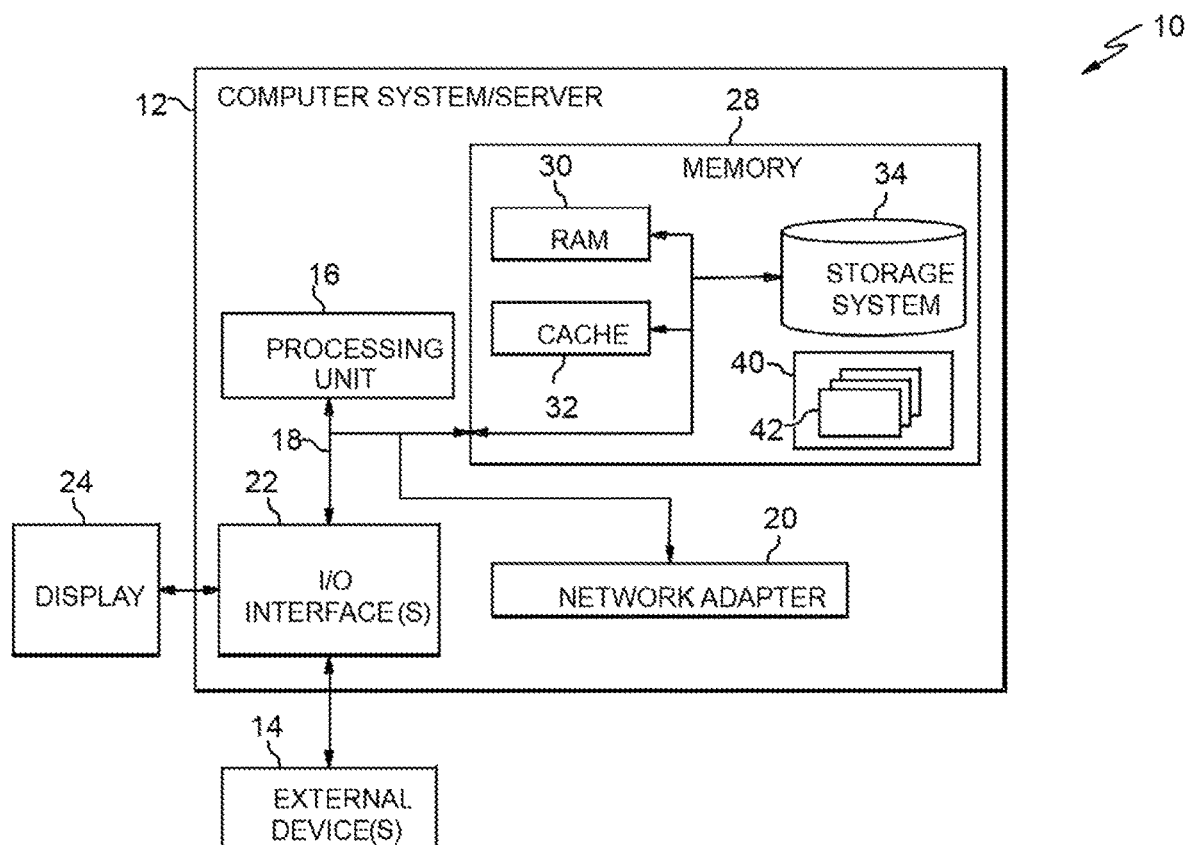
FIG. 1 depicts a cloud computing node according to an embodiment of the present invention.

As stated above, some users desiring a high level of security require their keys and secrets to be stored inside of a physical HSM stored on the premises of the user and be under the user's control. Users desiring this high level of security that are now using the cloud for various functions require a KMS for activities on the cloud, but may not be satisfied with the current level of security afforded by a cloud-based proxy HSM. Embodiments of the invention provide the benefit of added security for a proxy HSM by requiring that the HSM erase itself in the event that it loses contact with the physical HSM from which it is federated.

Optional embodiments of the invention provide a selected level of security by establishing a predetermined number of identifying communications that can be not received by the proxy HSM before the proxy HSM erases itself.

The present invention relates generally to the security of encrypted data and, more particularly, to the security of an encrypted key management service in the cloud. According to aspects of the invention a physical HSM stores an encryption key; a proxy HSM is federated from the physical HSM and stores a federated copy of the encryption key; the physical HSM sends a periodic identifying communication to the proxy HSM; the proxy HSM receives the periodic identifying communication from the physical HSM; and the proxy HSM erases itself and the federated copy of the encryption key if the proxy HSM does not receive the periodic identifying communication. In embodiments, the proxy HSM erases itself and the federated copy of the encryption key if the proxy HSM does not receiving a predetermined number of successive ones of the periodic identifying communication. In this manner, implementations of the invention advantageously improve the level of security of an encryption key that is accessible on the cloud.

Advantageously, embodiments of the invention provide improvements to the functioning of a secure computer device, for example an HSM. More specifically, aspects of the invention utilize the unconventional steps of an on-premise physical HSM sending an identifying communication to a proxy HSM and the proxy HSM erasing itself if the identifying communication is not received to enable the computer device to operate in a cloud-based environment with increased security. Thus, a technical solution to the technical problem of increasing cloud-based system security is provided.

In some customer or client applications, it is necessary for data or systems to be accessed through the cloud. In such applications, security is a concern because encryption keys residing on the cloud can be less secure than encryption keys residing on an on-premise physical HSM stored on a user's premises. A high level of security and control is provided by an on-premise physical HSM stored on a user's premises because the user has physical control over the on-premise physical HSM and control over access to the on-premise physical HSM. In some cloud-based systems, a proxy HSM is created on the cloud as a copy of the on-premise physical HSM so that access to the encryption keys through the cloud is possible without granting access to the on-premise physical HSM. Some users are not comfortable having a proxy HSM on the cloud because the server on which the proxy HSM resides is not under the physical control of the user.

Users desiring a high level of security often require their keys and/or secrets to be stored inside of an on-premise physical HSM that physically resides on the user's premises. For a cloud provider to create a hybrid solution, there is often a proxy HSM within the cloud that federates the user's on-premise physical HSM(s) into the cloud. If the proxy HSM remains when the physical connection between the on-premise physical HSM and the proxy HSM is removed (either by the user or some other entity), it can be a security liability. Embodiments of the invention disclose systems and methods to protect customers and simplify management for cloud service providers.

Embodiments of the invention include methods for cloud providers to create proxy HSMs that are tamper-resistant and self-destruct when the backing on-premise physical HSM is no longer present. Embodiments of the invention may comprise two components. The first component is an on-premise physical HSM which resides on the user's premises under the control of the user. The second component is a proxy read-only HSM (proxy HSM) that resides in the cloud and over which the user may have little or no physical control.

In embodiments, the proxy HSM runs in a protected environment that the cloud provider cannot modify, even in the cases where the cloud provider controls the physical environment in which the proxy HSM exists. In embodiments, there is no direct interface to change the state of the proxy HSM, and all operations to change the state of the proxy HSM are accomplished through the on-premise physical HSM that is under user control.

In embodiments, updates to the proxy HSM can only be installed if approved by the user. When the user creates an instance of hybrid HSM, the proxy HSM is created and bound to the on-premise physical HSM. In embodiments, proxy binding to the on-premise physical HSM happens only one time and cannot be changed. During the binding process, the on-premise physical HSM provides a public key and keeps the private key on-premise. In embodiments, each update for the key policy and/or the proxy HSM has to be signed by the on-premise physical HSM or it will be rejected by the apply update code which is protected by the protected environment in which the proxy HSM resides.

The proxy HSM expects to receive periodic identifying communications ("heartbeats") signed by the private key which is stored in the on-premise physical HSM controlled by the user. In embodiments, if several heartbeats are missed then the proxy HSM and the public key are deleted.

In the event of the proxy HSM being deleted, restoring a backup of the proxy HSM would not circumvent embodiments of the invention. This is because (1) backups of the proxy HSM are encrypted so that they can only be restored to the protected environment in which the proxy HSM exists, (2) the protected environment will not start the service without connection to the on-premise physical HSM, and (3) the proxy HSM will delete the public key after a predetermined number of missing heartbeats.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premise or off-premise.

Community cloud: the cloud infrastructure is shared by several organizations and supports a specific community that has shared concerns (e.g., mission, security requirements, policy, and compliance considerations). It may be managed by the organizations or a third party and may exist on-premise or off-premise.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
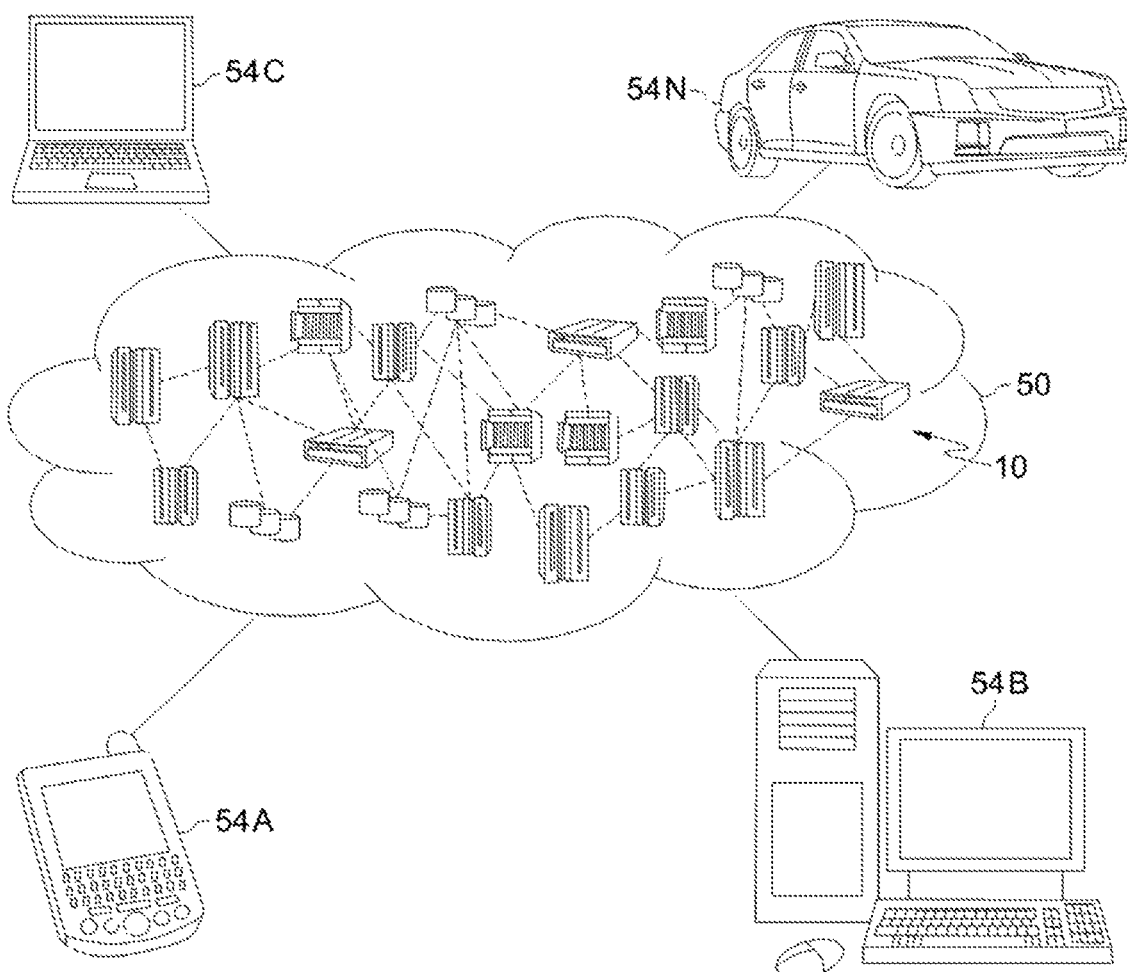
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
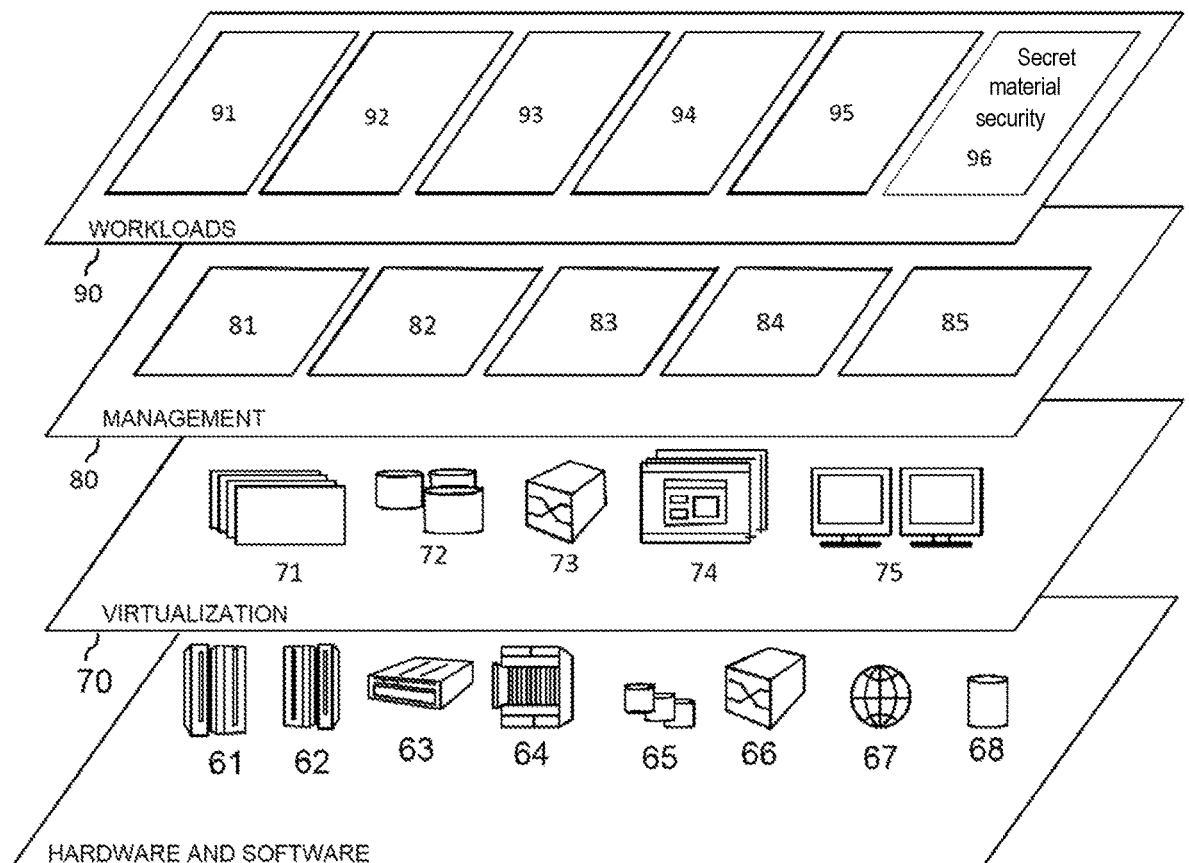
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and secret material security 96.

Implementations of the invention may include a computer system/server 12 of FIG. 1 in which one or more of the program modules 42 are configured to perform (or cause the computer system/server 12 to perform) one of more functions of the secret material security 96 of FIG. 3. For example, the one or more of the program modules 42 may be configured to: federate a proxy hardware security module from a physical hardware security module; store the proxy hardware security module; receive a periodic identifying communication from the physical hardware security module; and erase the proxy hardware security module as a result of the program module not receiving the periodic identifying communication.

Figure 4:
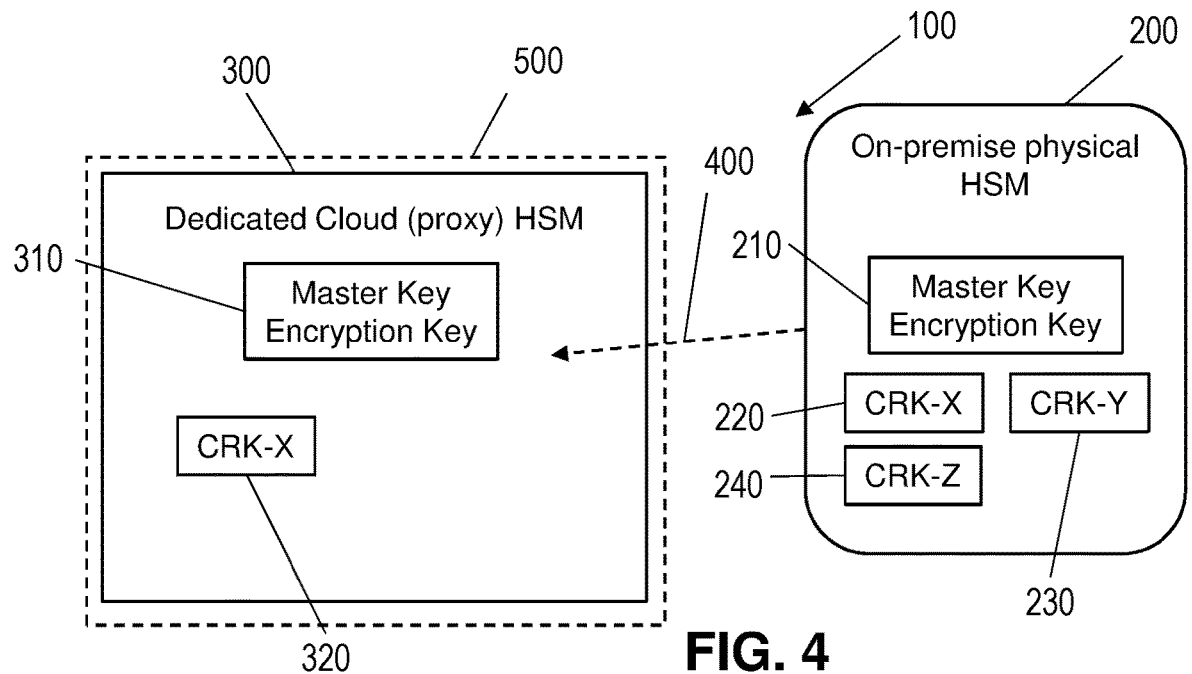
FIG. 4 shows a block diagram of an exemplary environment in accordance with aspects of the invention.

FIG. 4 shows a block diagram of an exemplary environment in accordance with aspects of the invention. In embodiments, the environment includes a system 100, for example a key management service (KMS) for providing a high level of security to a proxy HSM that exists on the cloud. The system 100, in this embodiment, includes an on-premise physical HSM 200 that resides on the physical premises of a user. In embodiments, the on-premise physical HSM is a piece of hardware such as a plug-in card or an external device that attaches directly to a computer or network server. For example, the storage system 34 of FIG. 1 can be an on-premise physical HSM. In embodiments, one of the nodes 10 of the cloud computing environment 50 of FIG. 2 can be the on-premise physical HSM 200. The on-premise physical HSM 200 has stored in it a master key encryption key 210 and a number of customer root keys (CRK), in this example, customer root keys CRK-X 220, CRK-Y 230, and CRK-Z 240. Although three customer root keys are shown in this example, fewer or more customer root keys can reside on the on-premise HSM 200. As used herein, CRK refers to a cryptographic key that is used for the encryption or decryption of other keys to provide confidential protection. While the CRK wraps keys in some of the embodiments described herein, it is noted that in other embodiments the CRK can wrap other types of secrets.

A dedicated cloud (or proxy) HSM 300 is federated from the on-premise physical HSM 200 and includes a copy 310 (public key) of the master key encryption key 210 (private key) and, in this example, a copy 320 (public key) of CRK-X 220 (private key). In this application, the term federated is understood to mean copied from such that a virtual copy of the on-premise physical HSM 200 is made to the cloud in the form of the proxy HSM 300. In embodiments, the proxy HSM 300 is located remotely from the on-premise physical HSM 200. In other embodiments, the proxy HSM 300 is located on a cloud server that is physically located in the same facility as the on-premise physical HSM 200 and, in some embodiments, both the cloud server and the on-premise physical HSM 200 are owned and/or operated by the same entity. In embodiments, the proxy HSM 300 is a virtual HSM that resides on a cloud server such as the cloud server 500 in FIG. 4 or the computer system/server 12 in FIG. 1. For example, one of the nodes 10 of the cloud computing environment 50 of FIG. 2 can be the cloud server 500. Although in this example, proxy HSM 300 includes a copy of only one CRK, other examples include copies of more than one of the CRKs stored on the on-premise physical HSM 200. An identifying communication 400 is sent from the on-premise physical HSM 200 to the proxy HSM 300 as described below. In embodiments, communication can also exist from the proxy HSM 300 to the on-premise physical HSM 200. Such communication can include, for example, confirmation of actions taken or keys accessed. In embodiments, the communications 400 are transmitted over a network connection such as, for example, a wired or wireless connection through the interne, a wide area network (WAN), a local area network (LAN), or some other network.

Figure 5:
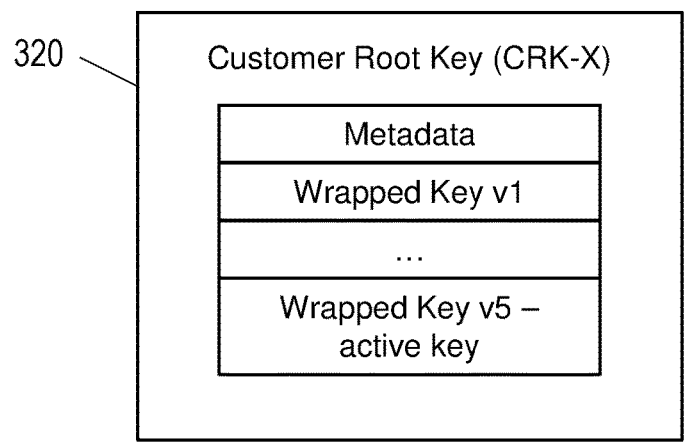
FIG. 5 shows a customer root key in accordance with aspects of the invention.

As shown in FIG. 5, CRK-X 320 includes metadata as well as several versions of the wrapped (encrypted) key. The several versions of the wrapped key include the current version or active key. While this example shows the customer root key protecting wrapped keys, it is noted that in other embodiments the protected information is some other type of secret information.

Figure 6:
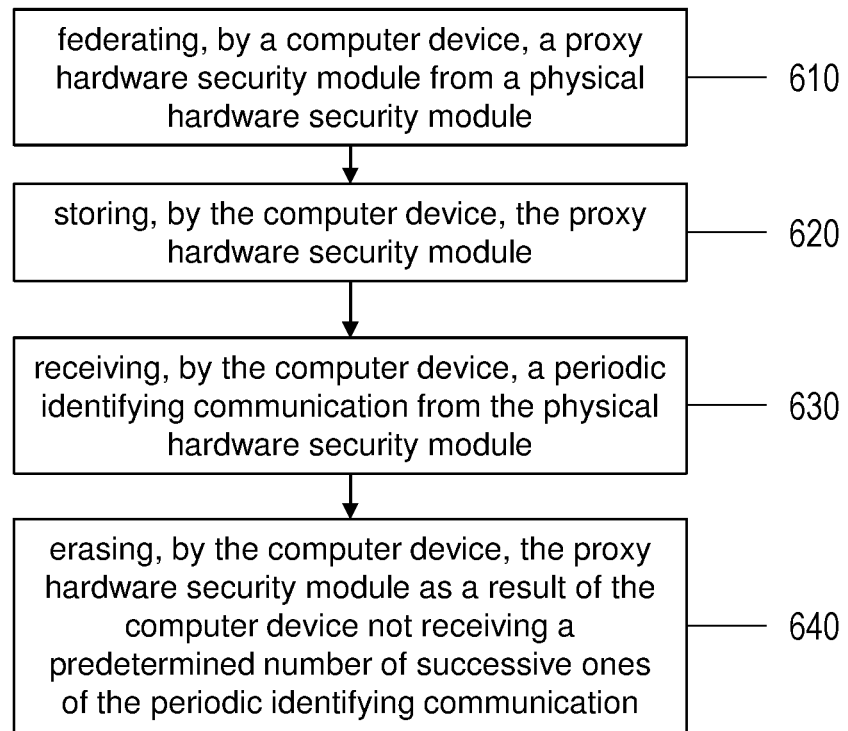
FIG. 6 shows a flowchart of an exemplary method in accordance with aspects of the invention.

FIG. 6 shows a flowchart of an exemplary method in accordance with aspects of the present invention. Steps of the method may be carried out in the environment of FIG. 4 and are described with reference to elements depicted in FIG. 4.

At step 610, the system 100 federates, by a computer device, the proxy HSM 300 from the on-premise physical HSM 200. In this example, the computer device is a cloud server, such as the cloud server 500 in FIG. 4. At step 620, the system 100 stores, by the computer device, the proxy HSM 300. In this example, the proxy HSM 300 is stored on the cloud server. At step 630, the system 100 receives, by the computer device, a periodic identifying communication for the on-premise physical HSM 200. At step 640, the system 100 erases, by the computer device, the proxy HSM 300 as a result of the computer device not receiving a predetermined number of successive ones of the periodic identifying communication. In embodiments, and as described with respect to FIG. 4, the on-premise physical HSM 200 sends periodic identifying communications (heartbeats) to the proxy HSM 300 that exists on the cloud. If the proxy HSM 300 does not receive the identifying communications that it is programmed to receive, the proxy HSM 300 erases itself. The threshold of communication failure that is considered sufficient to cause erasure is set by the user when the proxy HSM 300 is created. In embodiments, erasure is triggered when a predetermined number of successive ones of the identifying communication are not received. In other embodiments, erasure is triggered when a predetermined number of identifying communications are not received within a set time period. For example, if no identifying communication is received by the proxy HSM 300 in a five minute time span, then the proxy HSM 300 will erase itself. Other criteria regarding the number, duration, and pattern of missed communications can be used to trigger erasure of the proxy HSM 300. In embodiments, the proxy HSM 300 erases everything in the proxy HSM 300, including the public keys, when it erases itself. While this example uses encryption keys as the information that is protected on the proxy HSM 300, it is noted that any other secret information can likewise be protected on the proxy HSM 300 in accordance with the invention.

The erasure of proxy HSM 300 can include, for example, the overwriting of the proxy HSM 300 and all associated information on the cloud by any acceptable method including, but not limited to, overwriting with digital zeros and ones.

An embodiment in which the erasing of the proxy HSM results from the on-premise physical HSM not receiving a predetermined number of successive ones of the periodic identifying communication has the advantage of preventing the erasing of the proxy HSM in cases when it is not desired. For example, a minor interruption in power or processing could result in one or more identifying communications being missed by the proxy HSM. This is especially true if the time period between identifying communications is very short. In this case, in some embodiments, it is desirable to prevent erasure due to the identifying communications being missed.

An embodiment in which binding of the proxy HSM to the on-premise physical HSM is permitted and subsequent binding of the proxy HSM to the on-premise physical HSM is prevented has the advantage of preventing the use of a modified version of the proxy HSM. Preventing subsequent binding of the proxy HSM to the on-premise physical HSM prevents breaches in security from tampering with the proxy HSM because the changes in the proxy HSM will not be transferred to the on-premise physical HSM. This is because the tempered-with HSM will not be bound to the on-premise physical HSM.

An embodiment in which the erasing of the proxy HSM results from the on-premise physical HSM not receiving a predetermined number of the periodic identifying communications within a predetermined period of time has the advantage of preventing the erasing of the proxy HSM in cases when it is not desired. For example, a minor interruption in power or processing could result in one or more identifying communications being missed by the proxy HSM. This is especially true if the time period between identifying communications is very short. In this case, in some embodiments, it is desirable to prevent erasure due to the identifying communications being missed.

An embodiment in which changes to the proxy HSM are allowed only as a result of the proxy HSM receiving approval of the changes from the on-premise physical HSM has the advantage of preventing unauthorized changes to the proxy HSM by ensuring that all such changes are approved by the user.

An embodiment in which (1) the erasing of the proxy HSM results from the on-premise physical HSM not receiving a predetermined number of the periodic identifying communications within a predetermined period of time, and (2) changes to the proxy HSM are allowed only as a result of the proxy HSM receiving approval of the changes from the on-premise physical HSM, is also useful because it creates a more difficult environment for using an unauthorized copy of the proxy HSM.

Figure 7:
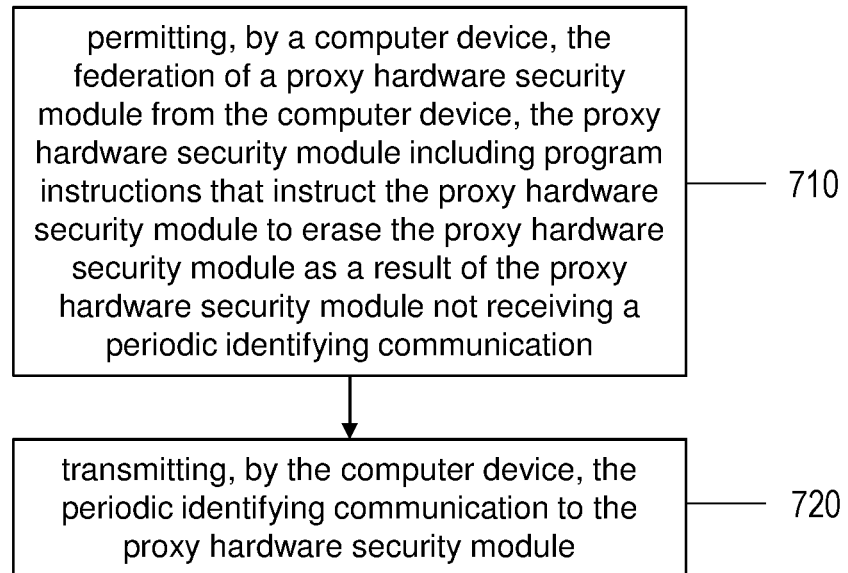
FIG. 7 shows a flowchart of an exemplary method in accordance with aspects of the invention.

FIG. 7 shows a flowchart of an exemplary method in accordance with aspects of the present invention. Steps of the method may be carried out in the environment of FIG. 4 and are described with reference to elements depicted in FIG. 4.

At step 710, the system 100 permits, by a computer device (for example, the on-premise physical HSM 200 in FIG. 4), the federation of a proxy HSM (for example the proxy HSM 300 in FIG. 4) from the computer device. The proxy HSM includes program instructions that instruct the proxy HSM to erase the proxy HSM as a result of the proxy HSM not receiving a periodic identifying communication. When the computer device permits the federation of the proxy HSM from the computer device, the computer device allows, for example, a cloud server to copy data from the computer device to create the proxy HSM. At step 720, the system 100 transmits, by the computer device, the periodic identifying communication to the proxy HSM 300.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product, the computer program product comprising a computer readable storage medium having program instructions embodied therewith, the program instructions executable by a computer device to cause the computer device to:

federate a proxy hardware security module from a physical hardware security module;

store the proxy hardware security module;

receive a first one of a plurality of periodic identifying communications from the physical hardware security module;

permit a binding of the proxy hardware security module to the physical hardware security module;

permit the physical hardware security module to prevent any subsequent binding of the proxy hardware security module to the physical hardware security module; and destroy the proxy hardware security module as a result of the computer device not receiving a second one of the plurality of periodic identifying communications.

2. The computer program product of claim 1, wherein the program instructions executable by the computer device cause the computer device to destroy the proxy hardware security module as a result of the computer device not receiving a predetermined number of successive ones of the plurality of periodic identifying communications.

3. The computer product of claim 1, wherein the program instructions executable by the computer device allow changes to the computer device only as a result of the computer device receiving approval of the changes from the physical hardware security module.

4. The computer product of claim 1, wherein the program instructions executable by a computer device cause the computer device to federate secret material from the physical hardware security module.

5. The computer product of claim 4, wherein the secret material is an encryption key.

6. The computer program product of claim 1, wherein the destroying of the proxy hardware security module results from the computer device not receiving a predetermined number of the plurality of periodic identifying communications within a predetermined period of time.

7. The computer program product of claim 1, wherein the program instructions executable by the computer device cause the computer device to federate secret material from the physical hardware security module.

8. The computer program product of claim 1, wherein the federating comprises creating the proxy hardware security module as a virtual copy of the physical hardware security module.

9. The computer program product of claim 8, wherein the federating comprises creating the proxy hardware security module in a cloud computing environment.

10. A system comprising:
a processor, a computer readable memory, and a computer readable storage medium;
program instructions to federate a proxy hardware security module from a physical hardware security module;
program instructions to store the proxy hardware security module;
program instructions to receive a first one of a plurality of periodic identifying communications from the physical hardware security module;
program instructions to permit a binding of the proxy hardware security module to the physical hardware security module;
program instructions to permit the physical hardware security module to prevent any subsequent binding of the proxy hardware security module to the physical hardware security module; and
program instructions to destroy the proxy hardware security module as a result of the processor not receiving a second one of the plurality of periodic identifying communications,
wherein the program instructions are stored on the computer readable storage medium for execution by the processor via the computer readable memory.

11. The system of claim 10, further comprising program instructions to destroy the proxy hardware security module as a result of the processor not receiving a predetermined number of successive ones of the plurality of periodic identifying communications.

12. The system of claim 10, further comprising program instructions to destroy the proxy hardware security module as a result of the computer device not receiving a predetermined number of the plurality of periodic identifying communications within a predetermined period of time.

13. The system of claim 10, further comprising program instructions to federate secret material from the physical hardware security module.

14. The system of claim 10, wherein the federating comprises creating the proxy hardware security module as a virtual copy of the physical hardware security module.

15. The system of claim 14, wherein the federating comprises creating the proxy hardware security module in a cloud computing environment.

16. A computer program product, the computer program product comprising a computer readable storage medium having program instructions embodied therewith, the program instructions executable by a computer device to cause the computer device to:
federate a proxy hardware security module from a physical hardware security module;
store the proxy hardware security module;
receive a first one of a plurality of periodic identifying communications from the physical hardware security module; and
erase the proxy hardware security module as a result of the computer device not receiving a second one of the plurality of periodic identifying communications,
wherein the program instructions executable by the computer device cause the computer device to: permit a binding of the proxy hardware security module to the physical hardware security module; and permit the physical hardware security module to prevent any subsequent binding of the computer device to the physical hardware security module.

17. The computer program product of claim 16, wherein the program instructions executable by the computer device cause the computer device to federate, during the binding, an encryption key from the physical hardware security module.

18. The computer program product of claim 16, wherein the program instructions executable by the computer device cause the computer device to provide, during the binding, an encryption key to the proxy hardware security module.

19. A system comprising:
a processor, a computer readable memory, and a computer readable storage medium;
program instructions to federate a proxy hardware security module from a physical hardware security module;
program instructions to store the proxy hardware security module;
program instructions to receive a first one of a plurality of periodic identifying communications from the physical hardware security module;
program instructions to erase the proxy hardware security module as a result of the processor not receiving a second one of the plurality of periodic identifying communications;
program instructions to permit a binding of the proxy hardware security module to the physical hardware security module; and
program instructions to permit the physical hardware security module to prevent any subsequent binding of the proxy hardware security module to the physical hardware security module,
wherein the program instructions are stored on the computer readable storage medium for execution by the processor via the computer readable memory.

20. The system of claim 19, further comprising program instructions to federate, during the binding, an encryption key from the physical hardware security module.

21. The system of claim 19, further comprising program instructions to provide, during the binding, an encryption key to the proxy hardware security module.

22. A computer program product, the computer program product comprising a computer readable storage medium having program instructions embodied therewith, the program instructions executable by a computer device to cause the computer device to:
store a proxy hardware security module federated from a physical hardware security module;
receive a first one of a plurality of periodic identifying communications from the physical hardware security module;

permit a binding of the proxy hardware security module to the physical hardware security module;

permit the physical hardware security module to prevent any subsequent binding of the computer device to the physical hardware security module; and erase the proxy hardware security module as a result of the computer device not receiving a second one of the plurality of periodic identifying communications.

23. The computer program product of claim 22, wherein the program instructions executable by the computer device cause the computer device to erase the proxy hardware security module as a result of the computer device not receiving a predetermined number of successive ones of the plurality of periodic identifying communications.

24. The computer product of claim 22, wherein the program instructions executable by the computer device allow changes to the computer device only as a result of the computer device receiving approval of the changes from the physical hardware security module.

25. The computer product of claim 22, wherein the program instructions executable by the computer device cause the computer device to federate an encryption key from the physical hardware security module during the binding.

\* \* \* \* \*